United States Patent
Walker et al.

(10) Patent No.: US 10,282,295 B1
(45) Date of Patent: May 7, 2019

(54) REDUCING CACHE FOOTPRINT IN CACHE COHERENCE DIRECTORY

(71) Applicant: ADVANCED MICRO DEVICES, INC., Santa Clara, CA (US)

(72) Inventors: William L. Walker, Fort Collins, CO (US); Michael W. Boyer, Bellevue, WA (US); Yasuko Eckert, Bellevue, WA (US); Gabriel H. Loh, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/825,880

(22) Filed: Nov. 29, 2017

(51) Int. Cl.
| | | |
|---|---|---|
| G06F 12/08 | (2016.01) | |
| G06F 12/0817 | (2016.01) | |
| G06F 12/0831 | (2016.01) | |
| G06F 12/0811 | (2016.01) | |
| G06F 12/128 | (2016.01) | |

(52) U.S. Cl.
CPC ...... *G06F 12/0828* (2013.01); *G06F 12/0811* (2013.01); *G06F 12/0831* (2013.01); *G06F 12/128* (2013.01); *G06F 2212/283* (2013.01); *G06F 2212/621* (2013.01)

(58) Field of Classification Search
None
See application file for complete search history.

(56) References Cited

U.S. PATENT DOCUMENTS

| | | | |
|---|---|---|---|
| 6,643,741 B1 * | 11/2003 | Shuf | G06F 12/0808 711/135 |
| 8,868,843 B2 | 10/2014 | Loh et al. | |
| 9,336,110 B2 * | 5/2016 | Fowles | G06F 11/30 |
| 2001/0010068 A1 | 7/2001 | Michael et al. | |
| 2001/0049771 A1 | 12/2001 | Tischler et al. | |
| 2005/0251626 A1 | 11/2005 | Glasco | |
| 2010/0228922 A1 | 9/2010 | Limaye | |
| 2011/0087843 A1 * | 4/2011 | Zhao | G06F 12/0864 711/129 |
| 2013/0346694 A1 | 12/2013 | Krick et al. | |
| 2014/0115257 A1 | 4/2014 | Dundas | |
| 2015/0212940 A1 * | 7/2015 | Fowles | G06F 11/30 711/130 |

(Continued)

OTHER PUBLICATIONS

Aemer Jaleel et al., "High Performance Cache Replacement Using Re-Reference Interval Prediction (RRIP)". ACM SIGARCH Computer Architecture News—ISCA 2010, vol. 38, Issue 3, Jun. 2010, 12 pages.

(Continued)

*Primary Examiner* — Kevin Verbrugge

(57) ABSTRACT

A method includes monitoring, at a cache coherence directory, states of cachelines stored in a cache hierarchy of a data processing system using a plurality of entries of the cache coherence directory. Each entry of the cache coherence directory is associated with a corresponding cache page of a plurality of cache pages, and each cache page representing a corresponding set of contiguous cachelines. The method further includes selectively evicting cachelines from a first cache of the cache hierarchy based on cacheline utilization densities of cache pages represented by the corresponding entries of the plurality of entries of the cache coherence directory.

20 Claims, 6 Drawing Sheets

(56) References Cited

U.S. PATENT DOCUMENTS

2017/0177484 A1    6/2017  Conway

OTHER PUBLICATIONS

International Search Report and Written Opinion dated Dec. 14, 2018 for corresponding International Application No. PCT/US2018/048154, 13 pages.
Intel, "Intel Data Direct I/O Technology (Intel DDIO): A Primer", Technical Brief, Revision 1.0; Feb. 2012, 11 pages.
Intel, "Intel Data Direct I/O Technology Overview," Intel Xeon Processor ES Family; 0612/BY/MESH/PDF; Jan. 2012, 4 pages.

* cited by examiner

REDUCING CACHE FOOTPRINT IN CACHE COHERENCE DIRECTORY

BACKGROUND

Processing systems often utilize a cache hierarchy for each processing node in the system. Each cache hierarchy includes multiple levels of caches available for access by one or more processor cores of the nodes. To maintain intra-node and inter-node coherency, such systems often employ probes that communicate requests to access blocks of data or status updates between various caches within the system. The volume of such probes can impact the performance of a processing system. As such, the cache hierarchy often employs a cache coherence directory (also commonly referred to as a "probe filter") that tracks the coherency status of cachelines involved in the cache hierarchy and filters out unnecessary probes, and thus reduces system traffic and access latency.

One common implementation of a probe filter is a page-based cache coherence directory that tracks groups of contiguous cachelines, with these groups frequently referred to as "cache pages." Thus, the cache coherence directory has a set of entries, with each entry available to store status information for a corresponding cache page for a given cache. However, due to cost and die size restrictions, the size of the cache coherence directory is limited, and thus the number of cache page entries of the cache coherence directory is limited. As such, the cache coherence directory may not be able to have a cache page entry available for every cache page that may have a cache line cached in the cache hierarchy, particularly in systems utilizing large level 2 (L2) or level 3 (L3) caches. When the cache coherence directory becomes oversubscribed, the cache coherence directory must selectively evict cache pages to make room for incoming cache pages by deallocating the corresponding cache page entry of the evicted cache page. The deallocation of a cache page entry in the cache coherence directory triggers a recall of the cachelines of the associated evicted cache page, which results in all of the data associated with the evicted cache page being made unavailable from the cache hierarchy. A subsequent request for data in the cache page therefore will necessarily require a memory access to obtain the requested data, which incurs a considerable access latency. Conventional approaches to reducing such recalls include either increasing the size of the cache coherence directory or increasing the size of the cache pages. However, increasing the size of the cache coherence directory increases die size and power consumption, which may be impracticable. Increasing the cache page size increases the likelihood of cache coherence directory oversubscription when executed workloads use relatively few cachelines from each cache page.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-7 illustrate systems and methods for efficient data caching in a cache hierarchy having a page-based probe filter or other cache coherence directory. In accordance with some embodiments, the cache coherence directory tracks sets, or "pages", of contiguous cachelines, with each entry of a cache page directory configured to store status information for cached cachelines of a corresponding cache page. As the number of such entries is limited, the cache coherence directory is at risk of oversubscription and thus requiring deallocation of entries so as to track other incoming cache pages, and the resultant eviction of the cachelines of the deallocated cache page from the cache hierarchy and the performance costs incurred therefrom. To reduce the number of cache page entries required by a given cache, that is, the "footprint" of the cache in the cache coherence directory, and thus reduce the frequency of cache coherence directory oversubscription, in at least one embodiment one or more caches of the cache hierarchy employ one or more selective cacheline eviction processes that result in cachelines from cache pages having few utilized cachelines (that is, "sparse" cache pages) being preferentially selected for eviction from the cache over cachelines from cache pages having many utilized cachelines (that is, "dense" cache pages). In doing so, all cachelines of a cache page ultimately may be evicted from the cache at an accelerated pace, thereby permitting the cache coherence directory to deallocate the corresponding cache page entry and thus make room for another cache page to be tracked by the cache coherence directory.

Figure 1:
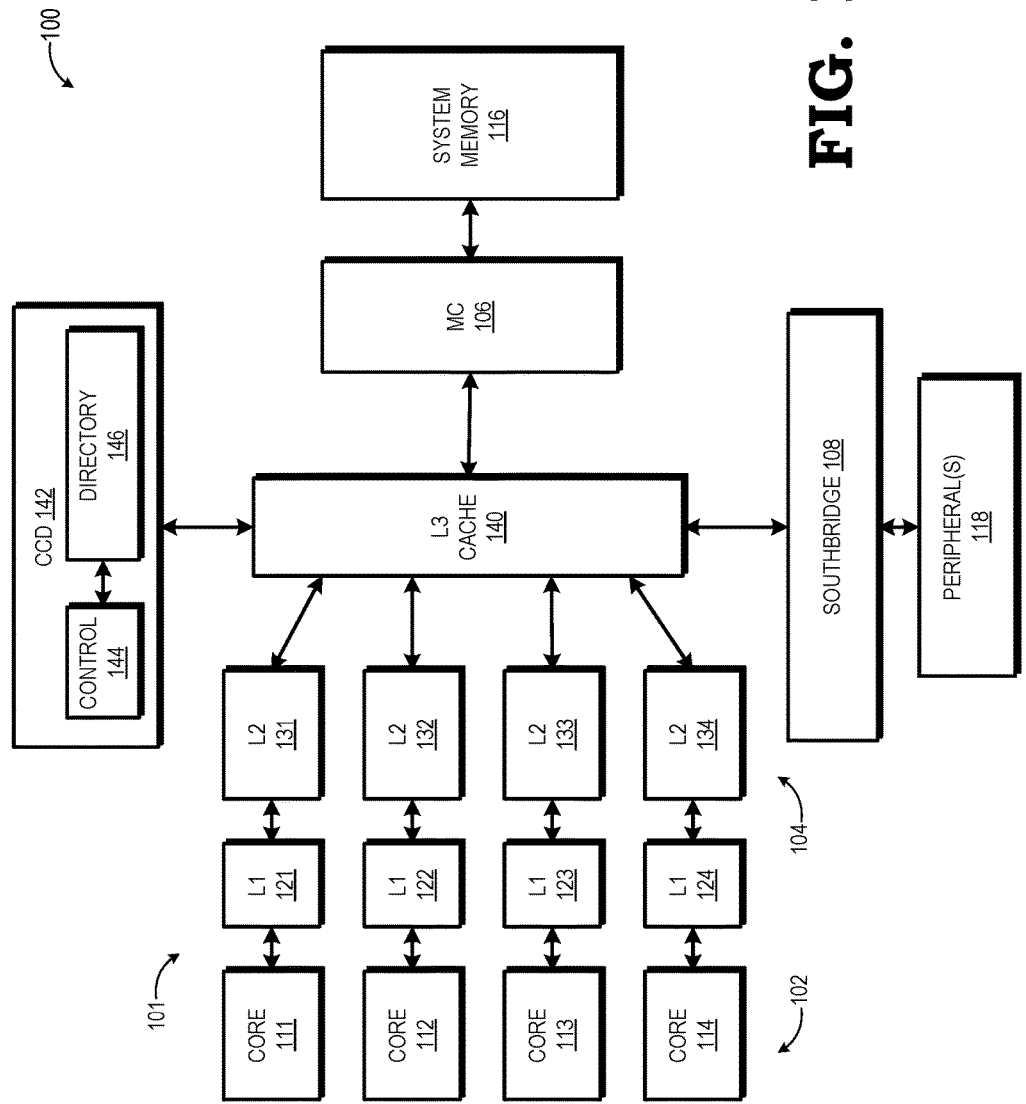
FIG. 1 is a block diagram of a data processing system employing a cache hierarchy with a page-based cache coherence directory in accordance with some embodiments.

FIG. 1 illustrates a processing system 100 using selective cacheline eviction based on per-page cacheline utilization density in accordance with at least some embodiments. In the depicted example, the processing system 100 includes one or more processing nodes, including processing node 101. The processing node 101 includes a compute complex 102, a cache hierarchy 104, a memory controller 106, and a southbridge 108. The compute complex 102 includes one or more processor cores, such as the four processor cores 111, 112, 113, 114. The processor cores include, for example, central processing unit (CPU) cores, graphics processing unit (GPU) cores, digital signal processor (DSP) cores, or a combination thereof. It will be appreciated that the number of processor cores of the compute complex 102 may be fewer or more than four.

The memory controller 106 operates as the interface between the cache hierarchy 104 and a system memory 116. Thus, data to be cached in the cache hierarchy 104 typically is manipulated as blocks of data referred to as "cachelines", and which are addressed or otherwise located in a memory hierarchy using a physical address of system memory 116.

Cachelines are accessed from the system memory 116 by the memory controller 106 in response to memory requests from the cache hierarchy 104, and the cachelines are installed, or cached, in one or more caches of the cache hierarchy 104. Likewise, when a cacheline containing modified data is evicted from the cache hierarchy 104 and thus needs to be updated in the system memory 116, the memory controller 106 manages this write-back process. The southbridge 108 operates as the interface between the cache hierarchy 104, the memory controller 106, and one or more peripherals 118 of the processing system 100 (e.g., network interfaces, keyboards, mice, displays, and other input/output devices).

The cache hierarchy 104 includes one or more levels of caches, such as a first level (L1), a second level (L2), and a third level (L3) of caches. Although the illustrated example includes three levels, in other embodiments the cache hierarchy 104 includes fewer than three levels or more than three levels. Each caching level includes one or more caches at that level. To illustrate, the core complex 102 implements small private caches for each processing core at L1, which are depicted as L1 caches 121, 122, 123, 124, each associated with a corresponding one of processor cores 111-114. Further, for L2, the core complex 102 implements larger private caches for each processor core, which are depicted as L2 caches 131, 132, 133, 134 corresponding to processor cores 111-114, respectively. Each of the L2 caches 131-134 is private to its corresponding processor core, but the cache hierarchy 104 operates to maintain coherency between the L2 caches 131-134. In other embodiments, two or more L1 caches may share a single L2 cache. For the L3 caching level, the cache hierarchy 104 implements an L3 cache 140 that is shared by the processor cores of the compute complex 102, and thus shared by at least the L2 caches 131-134. In other embodiments, the L3 caching level may include more than one L3 cache shared by the L2 caches 131-134 in various combinations. The L1 caches 121-124, L2 caches 131-134, and L3 cache 140 can be direct mapped or an N-way set associative cache in some embodiments.

The caches of the cache hierarchy 104 are used to cache data for access and manipulation by the processor cores 111-114. Typically, caches at a lower level (e.g., L1) tend to have lower storage capacity and lower access latencies, while caches at the higher level (e.g., L3) tend to have higher storage capacity and higher access latencies. Accordingly, cachelines of data are transferred among the caches of different cache levels so as to better optimize the utilization of the cache data in view of the caches' storage capacities and access latencies through cacheline eviction processes and cacheline installation processes managed by controller logic of the individual caches of the cache hierarchy 104.

The cache hierarchy 104 implements one or more coherency protocols, such as the Modified-Exclusive-Shared-Invalid (MESI) protocol or the Modified-Owned-Exclusive-Shared-Invalid (MOESI) protocol. To reduce the probes generated by the various caches of the cache hierarchy 104 in accordance with an implemented coherency protocol, in some embodiments the cache hierarchy 104 implements directory-based coherency, and thus implements a cache coherence directory (CCD) 142 to filter probes within the cache hierarchy 104, and in the event the processing node 101 is one of a plurality of processing nodes of the system 100, between the compute complex 102 and other compute nodes of the system 100.

As shown in FIG. 1, the CCD 142 includes a controller 144 and a directory structure 146. In at least one embodiment, the CCD 142 is a page-based cache coherence directory, that is, the CCD 142 tracks cachelines on the basis of groups of contiguous cachelines referred to as "cache pages" or simply "pages." To this end, the CCD 142 includes a plurality of page entries, each page entry configured to store information pertaining to the coherency state of cachelines of a corresponding cache page for which the page entry is allocated. An example format of the directory structure 146 is described in greater detail below with reference to FIG. 2. The directory structure 146 may be implemented by memory (e.g., static random access memory (SRAM) or dynamic RAM (DRAM)) separate from the memory implementing the caches of the cache hierarchy 104, or the directory structure 146 may be implemented at least in part in memory utilized by one or more caches. To illustrate, in some embodiments, a portion of the memory for use by the L3 cache 140 is instead used to implement the directory structure 146. The controller 144 operates to maintain the directory structure 146 and to manage incoming coherency probes, and is implemented as hard-coded logic on one or more integrated circuit (IC) chips implementing the processing system 100, as programmable logic, as configurable logic (e.g., fuse-configurable logic), one or more processors executing a program of instructions, or a combination thereof. In some embodiments, the CCD 142 maintains local density information; that is, the density of cached cachelines in use for the local caches of the node. However, in other embodiments, the CCD 142 may take a global view of cache page density information by sending page density information to the CCDs of other processing nodes when the interconnect coupling the nodes is otherwise idle or by piggybacking the information onto other inter-node messages (and in turn receive such information from the other CCDs and update its directory structure 146 accordingly).

In operation, whenever a cacheline is installed, evicted, or its coherency state is otherwise modified, the cache associated with that action may send a probe message that is received by the controller 144 of the CCD 142, which in turn updates the page entry in the directory structure 146 that is allocated to the cache page that includes the indicated cacheline. Moreover, certain updates, such as modification, invalidation, or eviction of a cacheline trigger the controller 144 to send directed, multi-cast, or broadcast probe messages to any other caches that may contain a copy of that cacheline so as to update their local coherency status indicators for that local copy of the cacheline. As such, the directory structure 146 maintains the current coherency and cached state of cachelines of cache pages currently in use by the system 100. As the centralized repository for the coherency state of corresponding cachelines, the CCD 142 acts to filter probes requested by the cores 111-114 or the caches of the cache hierarchy 104 such that a request to access a block of data is filtered and acted upon by the controller 144 using the coherency information in the directory structure 146.

The page-based tracking implemented by the CCD 142 permits the CCD 142 to require less memory than would be required for tracking on a cacheline-by-cacheline basis, and thus allowing either the CCD 142 to handle additional cache capacity for the same amount of storage, or allowing the CCD 142 to handle the same cache capacity for a smaller amount of storage, and thus consuming less die space and power. However, cache coherency directories utilizing page-based tracking can be negatively impacted by workloads that result in relatively few cachelines of any given page being cached in a given cache.

To illustrate, assume two caches each have the ability to store 512 cachelines. The first cache is involved in workloads executed by the cores 111-114 that result in an average of, for example, four cachelines per cache page being utilized. As such, if the first cache were fully utilized, the CCD 142 would need to allocate 128 page entries of the directory structure 146 to track the cache pages present in the first cache. In contrast, the second cache is involved in workloads executed by the cores 111-114 that result in an average of, for example, sixteen cachelines per page being utilized. If the second cache were fully utilized, the CCD would need to allocate only 32 page entries of the directory structure 146 for the same number of total cachelines (512 in this example). Accordingly, caches with sparse cache pages (that is, cache pages with relatively low cacheline utilization density in the cache) typically require more page entries in the directory structure 146 than caches with dense cache pages (that is, cache pages with relatively high cacheline utilization density in the cache). That is, caches with sparse cache pages typically have a bigger "footprint" in the CCD 142 than caches with dense cache pages. As such, frequent occurrences of sparse cache pages can lead to oversubscription of the CCD 142, which in turn can lead to recalls by the CCD 142 that can negatively impact system performance.

Accordingly, to reduce the prevalence of sparse cache pages in the cache hierarchy 104 and their corresponding impact on page entry utilization at the CCD 142, one or more caches of the cache hierarchy 104 employ one or a combination of processes that result in the preferential eviction of cachelines from cache pages with relatively low cacheline utilization density (that is, "sparse cache pages") over cachelines from cache pages with relatively high cacheline utilization density (that is, "dense cache pages"). As a result, the cachelines of sparse cache pages are eventually evicted from a cache, and thereby allowing the CCD 142 to deallocate the page entries that were allocated to those sparse cache pages, and thus allowing the deallocated page entries to be allocated to other cache pages and thereby reducing the risk of directory oversubscription. These processes are described in greater detail below with reference to FIGS. 4-7.

The designation of a cache page as "sparse" or "dense" by a cache or by the CCD 142 may be made on an absolute or relative basis. To illustrate, in some embodiments, a fixed threshold is set to define cache page as "sparse" or "dense". For example, the threshold may be set to a fixed number of cachelines (e.g., 16 cachelines) or a fixed percentage of the total number of cachelines per cache page (e.g., 20% of the N cachelines per cache page), and those cache pages having a cacheline utilization density at or below that threshold are designated "sparse" while those with cacheline utilization densities exceeding the threshold are designated "dense." Alternatively, the threshold between "sparse" and "dense" may be dynamically configured based on periodic statistical analysis of current cacheline utilization densities. To illustrate, the average cacheline utilization density for cache pages represented in the cache hierarchy 104 may be determined, and the threshold set as some percentage of that average (e.g., setting the threshold at 50% of the average cacheline utilization density). As yet another example, the cache pages may be rank ordered based on cacheline utilization density, and some fixed number or fixed percentage, or dynamically-changing number or percentage, of cache pages having the lowest cacheline utilization densities are designated as "sparse" and the remainder identified as "dense", or some number or percentage of cache pages having the highest cacheline utilization densities are designated as "dense" and the remainder identified as "sparse."

Figure 2:
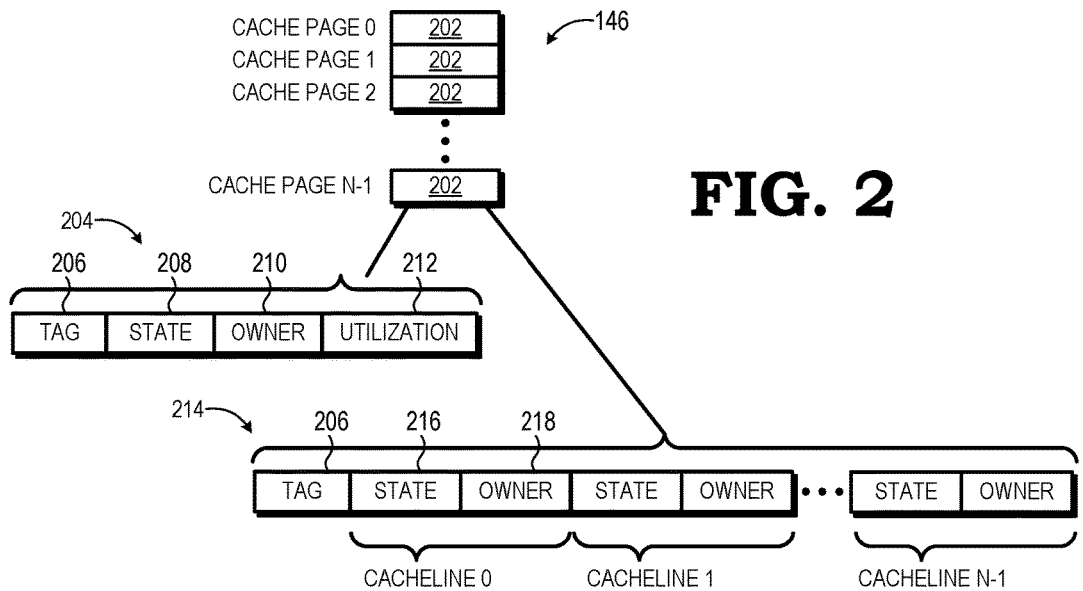
FIG. 2 is a block diagram illustrating a page-based cache coherence directory in accordance with some embodiments.

FIG. 2 illustrates example implementations of the directory structure 146 of the CCD 142 in accordance with at least some embodiments. As noted above, the directory structure 146 includes a plurality of page entries, such as the depicted set of page entries 202, whereby each page entry 202 has a plurality of fields configured to store various information regarding a cache page for which the page entry has been allocated. To illustrate, one implementation 204 of a page entry 202 includes a tag field that stores an address (or portion thereof) or other identifier of the corresponding cache page (e.g., an address portion of the first cacheline of the cache page), a state field 208 that stores coherency state information for the cachelines of the cache page, an owner field 210 that stores an identifier of the owner of the copy of the cachelines of the cache page (e.g., an identifier of the cache or core that currently owns the cache page), and a utilization field 212 that stores a representation of current number of cachelines of the cache page utilized among all of the cores 111-114. This representation may be an absolute number (e.g., 27 of 128 cachelines of a cache page are currently cached at the corresponding cache), an indication of range (e.g., between 40 and 60 cachelines of 128 cachelines of a cache page are currently cached at the corresponding cache), or a ratio or percentage (e.g., 42% of the cachelines of a cache page are currently cached at the corresponding cache). As such, the value stored at the utilization field 212 represents a cacheline utilization density of the corresponding cache page.

While concisely indicating the cacheline utilization density of the corresponding cache page, the implementation 204 of the page entry 202 does not specifically identify which cachelines of a cache page are currently cached at the corresponding cache. In contrast, the implementation 214 of the page entry 202 includes the same tag field 206 used to identify the corresponding cache page to which the page entry 202 has been allocated, but further includes a set of fields 216, 218 for each of the N cachelines of the cache page. The state field 216 identifies the current coherency state of the cacheline and the owner field 218 identifies the owner of the cacheline. This configuration permits the controller 144 to identify whether a specific cacheline of a cache page is cached in the cache hierarchy 104 or at some other cache hierarchy, as well as identifying the current coherency state of that specific cacheline and its current owner. Moreover, the controller 144 or other logic can determine the cacheline utilization density of the corresponding cache page based on the number of state fields 216 that indicate the corresponding cacheline is cached and valid (that is, utilized). That is, whereas the utilization field 212 of the implementation 204 directly indicates the cacheline utilization density for a corresponding cache page, for the implementation 214 the cacheline utilization density may be indirectly determined from the state fields 216.

Figure 3:
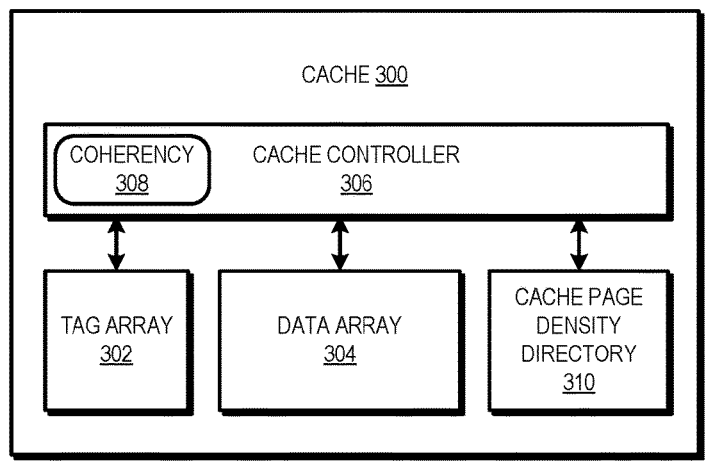
FIG. 3 is a block diagram illustrating a cache of a cache hierarchy in accordance with some embodiments.

FIG. 3 illustrates an example implementation of a cache of the cache hierarchy 104 in accordance with some embodiments. The depicted cache 300 represents the configuration of some or all of the caches 121-124, 131-134, or 140 of the cache hierarchy 104 as shown in FIG. 1. The cache 300 includes a tag array 302, a data array 304, and a cache controller 306. The data array 304 includes a plurality of data entries (not shown), or lines, each of which is configured to store a corresponding block of data (that is, "a cacheline") from the system memory 116. The tag array 302 likewise includes a plurality of tag entries (not shown), each of which is associated with a corresponding data entry of the data array 304 and which is configured to store various information regarding a cacheline stored in the corresponding data entry, such as the address (or portion thereof) associated with the cacheline in address field and one or more status bits stored in a status field.

In at least one embodiment, the cache controller 306 includes coherency logic 308 to implement corresponding aspects of one or more of the cacheline eviction techniques detailed below with reference to FIGS. 4-7. To facilitate this operation, the cache 300 further can include a cache page density directory 310 to store information regarding the cache utilization density of cache pages having cachelines stored in the data array 304. To illustrate, each entry of the cache page density directory 310 may be configured in a manner similar to that of the implementation 204 of the page entry 202 (FIG. 2), and includes a tag field to identify the corresponding cache page and a utilization field 212 representing, in some embodiments, the number of cachelines of that cache page that are currently cached at the cache 300 (that is, locally cached) or representing, in other embodiments, the number of cachelines of that cache page that are currently cached in all of the caches of the system 100 (that is, globally cached). It will be appreciated that the cache page density directory 310 differs from the directory structure 146 of the CCD 142 in that the cache page density directory 310 maintains cache utilization densities for cache pages present in only the cache 300, whereas the directory structure 146 maintains cache utilization densities for cache pages present throughout the cache hierarchy 104 or other specified cache coherency domain. As such, rather than implement a specific structure at each cache for tracking cacheline utilization densities on a per-page basis, the caches can instead be configured to access this same information from the CCD 142.

Figure 4:
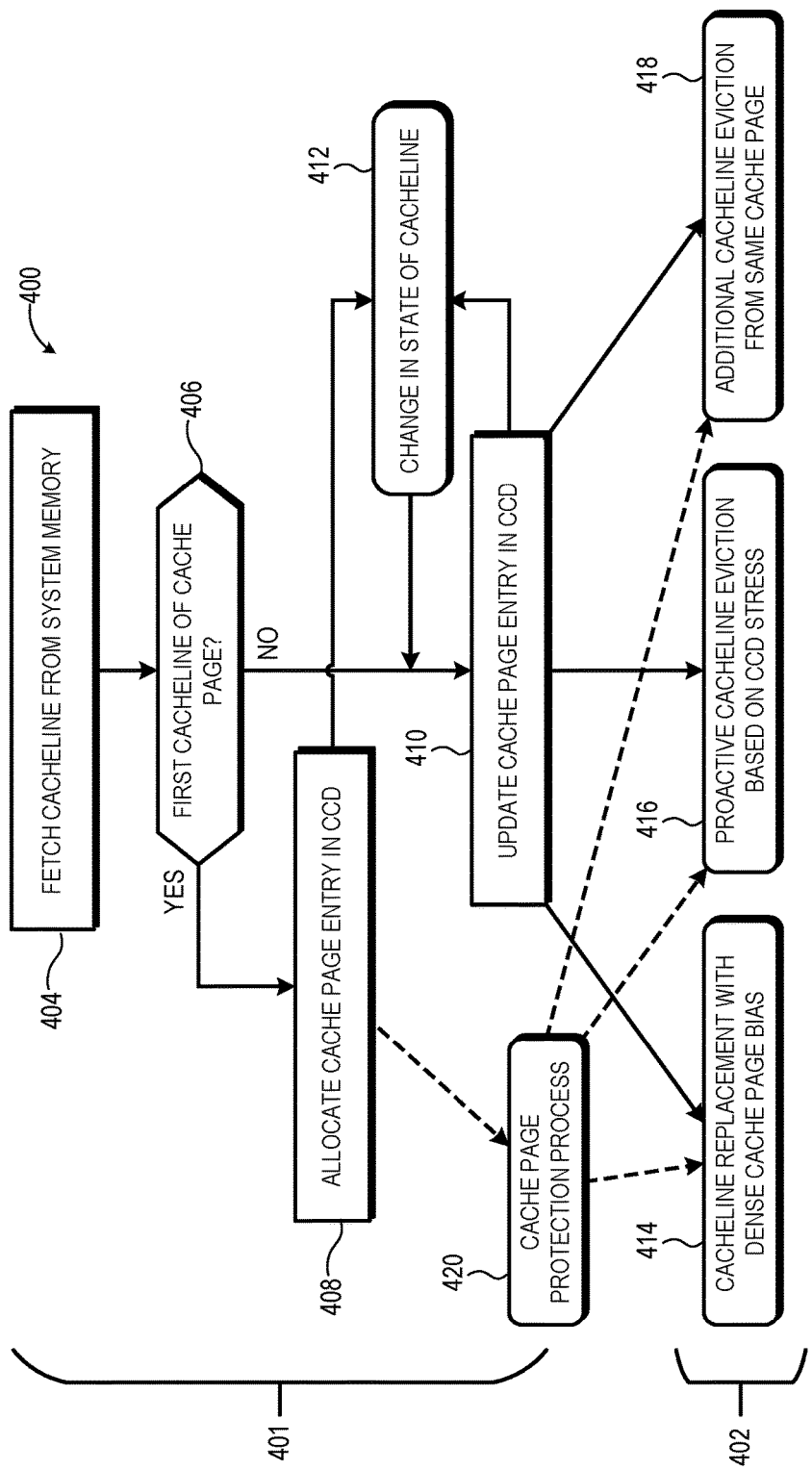
FIG. 4 is a flow diagram illustrating a method for reducing a footprint of a cache within a page-based cache coherence directory in accordance with some embodiments.

FIG. 4 illustrates an example method 400 of operation of the cache hierarchy 104 for preferentially maintaining dense cache pages so as to reduce a risk of CCD oversubscription in accordance with some embodiments. The method 400 has two processes that are performed in parallel: a directory maintenance process 401 and a selective cacheline eviction process 402. As explained above, the controller 144 of the CCD 142 maintains a directory structure 146 that tracks the cache status of cachelines on a per-page basis. As such, in response to the cache hierarchy 104 fetching a block of data as a cacheline from memory at block 404 (either as a prefetch or demand fetch), at block 406 the controller 144 determines whether the fetched cacheline is the first cacheline of the corresponding cache page to be cached in the cache hierarchy 104. If so, at block 408 the controller 144 allocates an unallocated page entry 202 (FIG. 2) from the directory structure 146 to the cache page of the fetched cacheline and initially populates the corresponding fields of the page entry 202 with the information representing the cache page. Otherwise, if a page entry 202 is already allocated for the cache page containing the fetched cacheline, at block 410 the controller 144 updates the corresponding page entry 202 to reflect the installment of the fetched cacheline in one or more caches of the cache hierarchy 104. This update includes modifying the value stored in the utilization field 212 for implementation 204 to reflect the increase in cacheline utilization density for the cache page with the installation of the fetched cacheline from the cache page or populating the state field 216 and owner field 218 for the corresponding cacheline for implementation 214 for the cacheline.

Thereafter, the CCD 142 monitors for probe messages indicating, at block 412, a change in the coherency state of the cacheline as a result of some operation on the cacheline by the corresponding cache. To illustrate, the cacheline could be modified in the cache, and changing the state of the cacheline to Modified (M) or Owned (O), or the cacheline could be evicted from the cache, changing its state to either Uncached (U) or Invalid (I) depending on the coherency protocol, and so forth. In response to a probe message indicating such a change in coherency state, at block 410 the controller 144 updates the cache page entry 202 of the cache page containing the modified cacheline to reflect its modified status. In particular, when the changed status of a cacheline indicates that the cacheline has been evicted from a cache or is otherwise invalid in that cache (that is, the cacheline is no longer cached or utilized at that cache), the controller 144 updates the utilization field 212 (for implementation 204 of page entry 202) or updates the fields 216, 218 (for implementation 214 of page entry 202) so as to reflect a decreased cacheline utilization density for the cache page as a result of the eviction/removal of the cacheline from the corresponding cache. Further, when the cache page entry 202 indicates that no cachelines are presently cached in the cache hierarchy 104 for a corresponding cache page, then the update performed at block 410 further may include deallocation of the page entry 202 from the directory structure 146, and thus allowing the page entry 202 to be allocated to another cache page. In this manner, the process 401 thus repeats for each new cacheline fetched from system memory 116 (block 404) and for each modification to an existing cacheline (block 412).

In the configuration described above, the tracking structure of the CCD 142 may be particular to one cache coherency domain (CCD) (e.g., the cache hierarchy 104) while the system 100 may have multiple CCDs. As such, the CCD 142 may not have a global view of page density. For example, a page might be sparse in one CCD but dense when all CCDs are considered. Accordingly, to ensure the CCD 142 takes a more global view of page density, in some embodiments the CCD for each processing node is configured to opportunistically transmit (e.g., when the interconnect fabric is idle or piggybacking on other messages) one or more messages representing global-level representations of cacheline utilization densities for the cache pages. Each CCD then may use the information in these messages to update the local, per-CCD tracking structure to improve its accuracy.

In parallel with the process 401 performed by the CCD 142, one or more caches of the cache hierarchy 104 perform one or a combination of techniques of process 402 so as to reduce the incidence of sparse cache pages in these caches, and thus reduce the footprints of the caches in the directory structure 146 of the CCD 142. These techniques include: a technique 414 in which the cache utilizes a cache replacement algorithm that is biased toward maintaining cachelines from cache pages with higher cacheline utilization densities; a technique 416 in which the cache monitors the "stress" on the CCD 142 (that is, how many cache page entries 202 are already allocated or the rate of such allocation) and proactively evicts cachelines from its spare cache pages so as to alleviate the "stress" on the CCD; and a technique 418 in which, in response to selecting a cacheline for eviction, the cache determines whether the selected cacheline is from a sparse cache page, and if so, selects one or more other cachelines from that sparse cache page for eviction as well. The techniques 414, 416, and 418 are described in greater detail below with reference to FIGS. 5, 6, and 7, respectively.

Returning to block 408 of process 401, it will be appreciated that when the first cacheline of a cache page is installed in the cache hierarchy 104, the cache page at that moment is a "sparse" cache page, even though it may quickly become a dense cache page with subsequent fetches of cachelines for that cache page. Accordingly, to prevent such newly-allocated cache pages from being prematurely targeted for preferential eviction from the cache hierarchy 104, in at least one embodiment the cache hierarchy 104 employs a protection process 420 in which a newly allocated cache page in the directory structure 146 is protected from sparse-page-based cacheline eviction targeting in the techniques 414, 416, 418 for a specified duration so as to allow the cache page to develop into a dense page if it otherwise would do so. This specified duration may be tracked using, for example, a countdown timer that is initiated when the corresponding page entry 202 is allocated and is decremented using any of a variety of indications of the passage of time or approximate correlations thereof, including clock cycles, number of page entries allocated thereafter, number of cacheline prefetches conducted thereafter, and the like.

Figure 5:
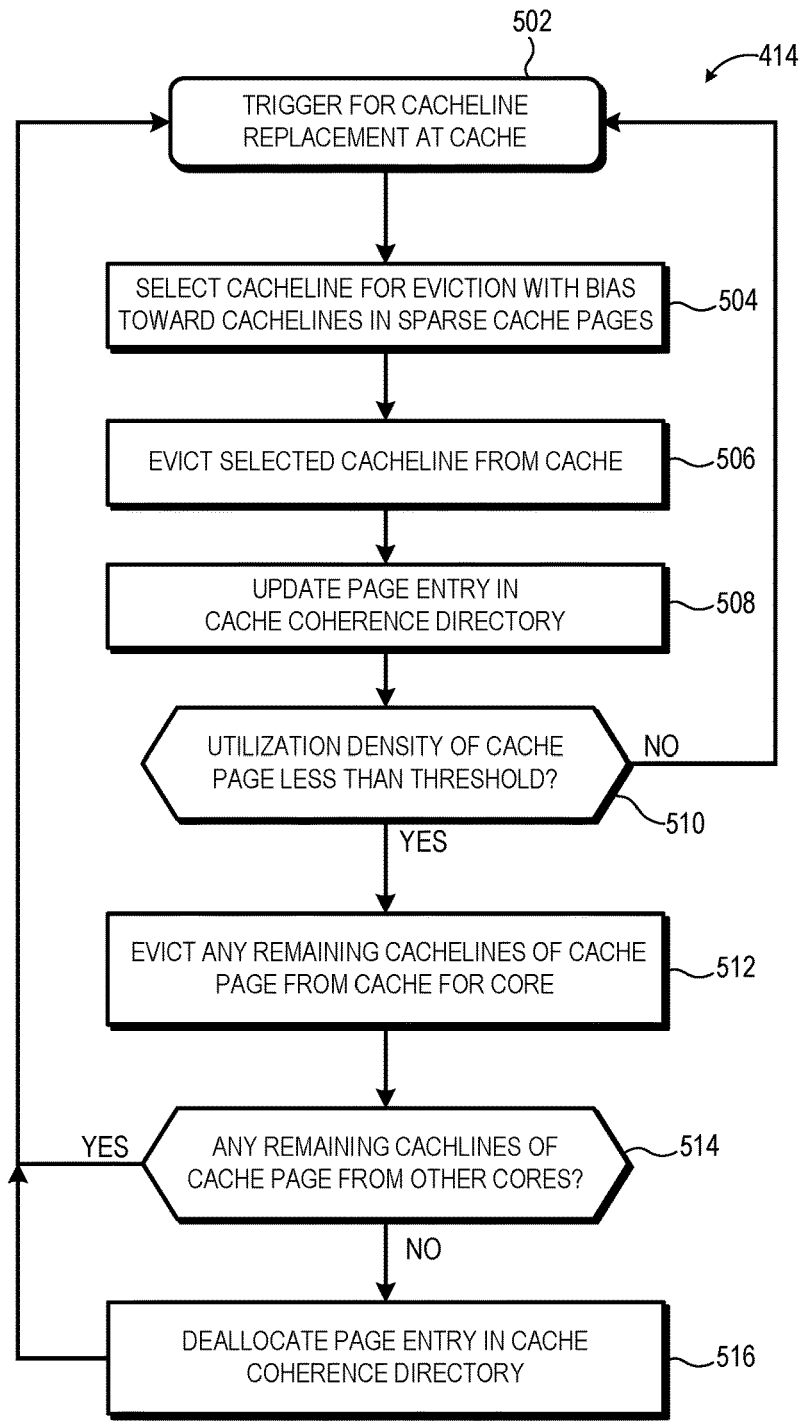
FIG. 5 is a flow diagram illustrating a method for implementing a cache replacement algorithm that preferentially evicts cachelines from sparse cache pages in accordance with some embodiments.

FIG. 5 illustrates the technique 414 for preferentially selecting cachelines from sparse cache pages for eviction based on cacheline replacement in accordance with some embodiments. The technique 414 initiates at block 502, in which the cache (e.g., cache 300) initiates or triggers a cache replacement process for evicting a cacheline from the cache. The cache replacement process typically is triggered responsive to oversubscription of the cache; that is, the cache must evict a cacheline so as to make room for an incoming cacheline. In response, at block 504 the cache controller 306 (FIG. 3) of the cache employs a cacheline replacement algorithm that is biased toward selection of victim cachelines from sparse pages for eviction over cachelines from dense pages. For example, the cache controller 306 accesses the cache page density directory 310 to identify how many cachelines are present in the cache for each cache page present in the cache, and from this information identifies which cache pages present in the cache are sparse cache pages and which are dense cache pages. The cache controller 306 then may configure the cacheline replacement algorithm employed by the cache controller 306 to preferentially select one or more victim cachelines from the identified sparse cache pages. As an example, if the cache controller 306 were to employ a Re-Reference Interval Prediction (RRIP)-based cache replacement algorithm, then the cache controller 306 configures the RRIP algorithm to either avoid selection from the dense cache pages entirely, or injects cachelines from the sparse cache pages into the RRIP algorithm so as to bias the selection process to select cachelines from sparse cache pages more frequently than cachelines from dense cache pages.

With a cacheline so selected by the cacheline replacement algorithm, at block 506 the cache controller 306 evicts the selected cacheline from the cache. This eviction process typically includes invalidating or otherwise deallocating the corresponding entries in the tag array 302 and data array 304 and by sending a probe message to indicate that the coherency status of the evicted cacheline has changed to an invalid or otherwise uncached status for that cache. In response to this probe message, at block 508 the controller 144 of the CCD 142 updates the corresponding page entry 202 in the directory structure 146 to reflect the evicted status of the cacheline for the corresponding cache. The corresponding entry of the cache page density directory 310 likewise is updated if the cache page density directory 310 is in use.

The eviction of cachelines from a sparse page reduces the cacheline utilization density of the sparse page even further (that is, makes the sparse page even more "sparse"), and at some point the sparse page may become sufficiently sparse as to trigger its eviction from the cache (and thus the deallocation of the corresponding page entry 202 from the directory structure 146 of the CCD 142). Accordingly, at block 510 the cache controller 306 determines the updated cacheline utilization density of the sparse page after one of its cachelines is evicted at block 506 and compares this value to a specified threshold. The threshold may be set to a fixed value (e.g., set to 0 or 10% of the total number of cachelines in a cache page), determined dynamically based on a statistical analysis of the cacheline utilization densities for that cache (e.g., set to 25% of the average cacheline utilization density), and the like.

In the event that the cacheline utilization density is below the specified threshold, at block 512 the cache evicts all remaining cachelines of the sparse page from the cache for the core evicting the cacheline at blocks 504 and 506, and signals this wholesale eviction of the cache page via one or more probe messages. The CCD 142 updates the page entry 202 for the sparse page in response, and the cache page density directory 310 likewise is updated. As other cores may be caching cachelines from this same cache page, at block 514 the CCD 142 determines whether there are any remaining cachelines in the sparse page for other processor cores. If so, the method flow returns to block 502 for the next triggered cacheline replacement. Otherwise, if no other core has a valid cacheline cached for the sparse page, the updated page entry 202 reflects that there are no cachelines currently cached for the sparse page. Accordingly, at block 516 the controller 144 deallocates the page entry 202 from the sparse page, and thus reducing the risk of oversubscription.

Figure 6:
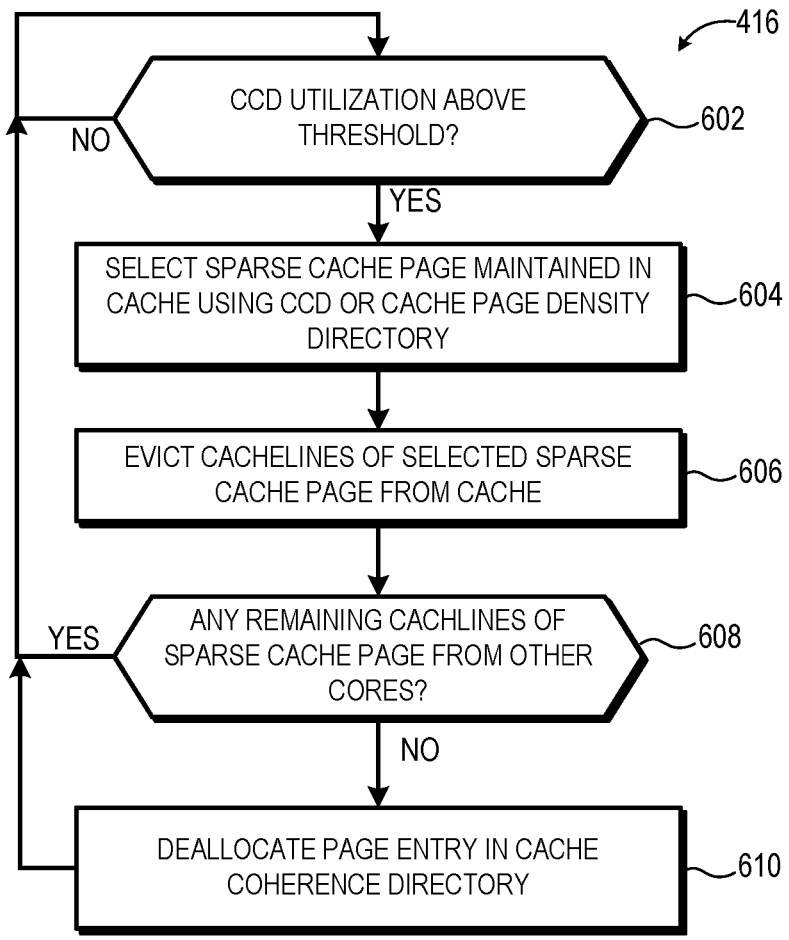
FIG. 6 is a flow diagram illustrating a method for proactive selective cacheline eviction based on cache page density in accordance with some embodiments.

FIG. 6 illustrates the technique 416 for reducing cache coherence directory stress via proactive eviction of entire sparse cache pages from a cache in accordance with some embodiments. The technique 416 initiates at block 602, in which the cache (e.g., cache 300) monitors the CCD 142 to determine a current CCD utilization metric. The CCD utilization metric is reflective of the current probe subscription state, that is, the current utilization of the page entries 202 of the directory structure 146, and reflects one or both of a number or ratio of allocated page entries 202 or a rate of allocation of page entries 202. The cache controller 306 of the cache compares the CCD utilization metric with a specified threshold identified as representing a potential stress situation for the CCD 142 (e.g., pending or actual oversubscription).

In the event that the CCD utilization metric exceeds the threshold, at block 604 the cache controller 306 identifies a sparse cache page from the cache pages having cachelines stored at the cache using one or both of the cache page density directory 310 (FIG. 3) or cacheline utilization densities determined from the directory structure 146. From these identified sparse cache pages, the cache controller 306 selects a sparse cache page (e.g., by selecting the sparsest cache page or the least recently used (LRU) sparse cache page). At block 606, the cache controller 306 evicts the cached cachelines of the selected sparse cache page from the cache (that is, deallocates or otherwise clears the entire sparse cache page from the cache) and sends one or more probe messages to the CCD 142 reflecting these evictions. As other caches may still be caching cachelines from this sparse page, at block 608 the CCD 142 determines whether there are any remaining valid cachelines for the sparse cache page with other caches. If so, the method flow returns to block 602. If not, at block 610 the controller 144 of the CCD 142 identifies the cache page as entirely absent from the cache, and thus deallocates the corresponding page entry 202, thereby freeing up a page entry 202 for another cache page. Likewise, the cache controller 306 may update the cache page density directory 310 to reflect these deallocations.

Figure 7:
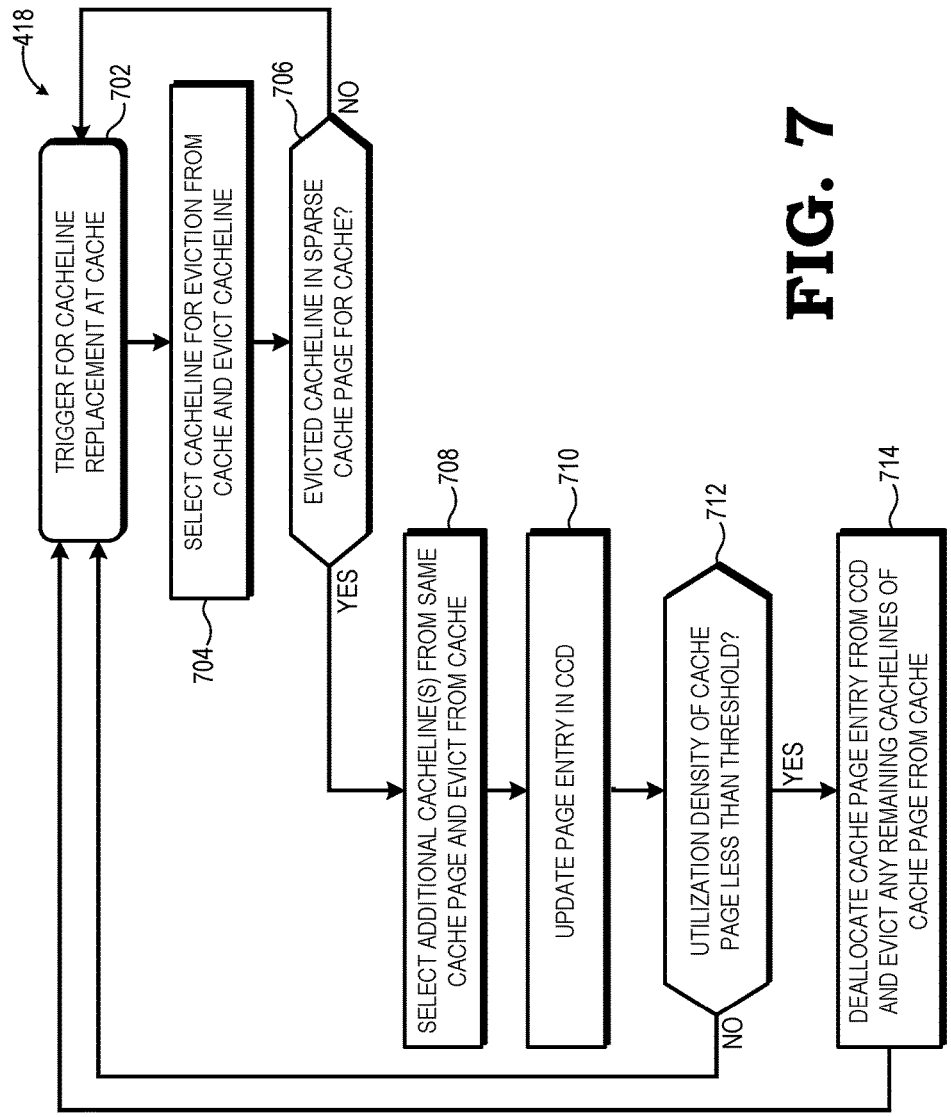
FIG. 7 is a flow diagram illustrating a method for selecting additional cachelines for eviction based on cache page density in accordance with some embodiments.

FIG. 7 illustrates the technique 418 for reducing CCD stress via proactive eviction of additional cachelines from sparse cache pages in accordance with at least one embodiment. The technique 418 initiates at block 702, in which the cache (e.g., cache 300) initiates or triggers a cache replacement process for evicting a cacheline from the cache. In response, at block 704 the cache controller 306 (FIG. 3) of the cache employs a cacheline replacement algorithm to select a victim cacheline for replacement. In this approach, a conventional cacheline replacement algorithm (that is, one that doesn't bias toward victimizing sparse cache pages) may be used. The cache controller 306 then evicts the selected cacheline from the cache.

At block 706, the cache controller 306 identifies which cache pages represented at the cache are sparse pages and determines whether the cacheline selected for eviction at block 704 is part of one of the identified sparse cache pages. If not, eviction of the cacheline selected at block 704 proceeds and the method flow returns to block 702. Otherwise, if the selected victim cacheline is a member of one of the identified sparse cache pages, then at block 708 the cache controller 306 selects one or more additional cachelines from that same sparse cache page as additional victim cachelines and evicts these additional cachelines as well. Accordingly, at block 710 the CCD 142 updates the page entry 202 for the sparse cache page to reflect the eviction of the victim cacheline selected and evicted at block 704 and the eviction of the additional cachelines selected and evicted at block 708 (and the cache page density directory 310 also may be updated accordingly). As such, when a victim cacheline is from a sparse cache page the process of blocks 706, 708, 710 results in the sparse cache page becoming even more sparse in the CCD 142, and thus more likely to be deallocated from the CCD 142. Accordingly, at block 712 the controller 144 of the CCD 142 determines the updated cacheline utilization density of the sparse cache based on information from the corresponding page entry 202 and compares this metric to a specified threshold (see, e.g., block 510 of FIG. 5, discussed above). In the event that the cacheline utilization density is above this threshold, the page entry 202 is maintained for the sparse cache page. Otherwise, if the cacheline utilization density falls below the threshold, then at block 714 the controller 144 deallocates the page entry 202, thereby freeing up the page entry 202 for allocation to another cache page, and the cache controller 306 likewise updates the cache page density directory 310 if in use. Further, the deallocation of the page entry 202 triggers the controller 144 to send probe messages to direct the cache to evict all remaining cached cachelines for the corresponding cache page, and thus clearing the cache page entirely from the cache.

In some embodiments, the apparatus and techniques described above are implemented in a system including one or more integrated circuit (IC) devices (also referred to as integrated circuit packages or microchips), such as the system 100 described above with reference to FIGS. 1-7. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A data processing system comprising:
a cache hierarchy having a plurality of caches including a first cache and a cache coherence directory;
wherein the cache coherence directory is configured to monitor states of cachelines stored in the cache hierarchy, the cache coherence directory having a plurality of entries, wherein each entry is associated with a corresponding cache page of a plurality of cache pages, each cache page representing a corresponding set of contiguous cachelines; and
wherein the first cache includes a controller configured to selectively evict cachelines from the first cache based on cacheline utilization densities of cache pages in the cache coherence directory.

2. The data processing system of claim 1, wherein the controller is to preferentially select for eviction cachelines from cache pages with relatively low cacheline utilization densities over cachelines from cache pages with relatively high utilization densities.

3. The data processing system of claim 1, wherein:
the cache hierarchy includes a directory structure having a plurality of entries corresponding to a plurality of cache pages, each entry storing data representing a number of cachelines of the cache page cached in at least one cache of the cache hierarchy; and
the controller is configured to selectively evict cachelines by:
identifying a cacheline utilization density for each of at least a subset of the plurality of cache pages using the directory structure; and
implementing a cacheline replacement algorithm that preferentially selects cachelines from cache pages with relatively low cache utilization densities for eviction.

4. The data processing system of claim 3, wherein:
the controller is configured to identify each cache page of the at least a subset of cache pages as either a sparse cache page or a dense cache page based on the cacheline utilization density of that cache page; and
the cacheline replacement algorithm preferentially selects cachelines from cache pages identified as sparse cache pages.

5. The data processing system of claim 3, wherein:
the cache coherence directory implements the directory structure; and
each entry of the directory structure is configured to store data representing a number of cachelines of the cache page present in the caches of the cache hierarchy.

6. The data processing system of claim 3, wherein:
the first cache implements the directory structure; and
each entry of the directory structure is configured to store data representing a number of cachelines of the cache page present in the first cache.

7. The data processing system of claim 1, wherein:
the cache hierarchy includes a directory structure having a plurality of entries corresponding to a plurality of cache pages, each entry storing data representing a number of cachelines of the cache page present in at least one cache of the cache hierarchy; and
the controller is configured to selectively evict cachelines by:
monitoring a subscription state of the cache coherence directory based on the directory structure;
responsive to the subscription state indicating the cache coherence directory is oversubscribed:
identifying a cacheline utilization density for each of at least a subset of the plurality of cache pages using the directory structure;
selecting a cache page having a relatively low cacheline utilization density; and
evicting all cached cachelines of the selected cache page from the first cache; and
the cache coherence directory is configured to deallocate the entry corresponding to the cache page responsive to the first cache evicting all cached cachelines of the selected cache page.

8. The data processing system of claim 1, wherein:
the cache hierarchy includes a directory structure having a plurality of entries corresponding to a plurality of cache pages, each entry storing data representing a number of cachelines of the cache page present in at least one cache of the cache hierarchy; and
the controller is configured to selectively evict cachelines by:
selecting a cacheline for eviction based on a cacheline replacement policy;
determining a cacheline utilization density of the cache page containing the cacheline based on the directory structure; and
responsive to the cacheline utilization density of the cache page being less than a specified threshold, selecting one or more additional cachelines of the cache page for eviction from the first cache.

9. The data processing system of claim 1, wherein:
the controller is configured to prevent selection of cachelines of a cache page for eviction for a specified duration following allocation of an entry in the cache coherence directory for the cache page.

10. A method for caching data in a data processing system, the method comprising:
monitoring, at a cache coherence directory, states of cachelines stored in a cache hierarchy of the data processing system using a plurality of entries of the cache coherence directory, each entry associated with a corresponding cache page of a plurality of cache pages, and each cache page representing a corresponding set of contiguous cachelines; and
selectively evicting cachelines from a first cache of the cache hierarchy based on cacheline utilization densities of cache pages represented by the corresponding entries of the plurality of entries of the cache coherence directory.

11. The method of claim 10, wherein selectively evicting cachelines comprises preferentially selecting for eviction those cachelines from cache pages with relatively low cache utilization densities over cachelines from cache pages with relatively high cache utilization densities.

12. The method of claim 10, further comprising:
maintaining a directory structure having a plurality of entries corresponding to a plurality of cache pages, each entry storing data representing a number of cachelines of the cache page cached in at least one cache of the cache hierarchy; and
wherein selectively evicting cachelines comprises:
identifying, at the first cache, a cacheline utilization density for each of at least a subset of the plurality of cache pages using the directory structure; and
implementing, at the first cache, a cacheline replacement algorithm that preferentially selects cachelines from cache pages with relatively low cache utilization densities for eviction.

13. The method of claim 12, further comprising:
identifying, at the first cache, each cache page of the at least a subset of cache pages as either a sparse cache page or a dense cache page based on the cacheline utilization density of that cache page; and
wherein the cacheline replacement algorithm preferentially selects cachelines from cache pages identified as sparse cache pages for eviction.

14. The method of claim 12, wherein:
the cache coherence directory implements the directory structure; and
each entry of the directory structure stores data representing a number of cachelines of the cache page present in the caches of the cache hierarchy.

15. The method of claim 12, wherein:
the first cache implements the directory structure; and
each entry of the directory structure stores data representing a number of cachelines of the cache page present in the first cache.

16. The method of claim 10, further comprising:
maintaining a directory structure having a plurality of entries corresponding to a plurality of cache pages, each entry storing data representing a number of cachelines of the cache page present in at least one cache of the cache hierarchy; and
wherein selectively evicting cachelines comprises:
monitoring a subscription state of the cache coherence directory based on the directory structure;
responsive to the subscription state indicating the cache coherence directory is oversubscribed:
identifying a cacheline utilization density for each of at least a subset of the plurality of cache pages using the directory structure;
selecting a cache page having a relatively low cacheline utilization density; and
evicting all cached cachelines of the selected cache page from the first cache; and
deallocating, at the cache coherence directory, the entry corresponding to the cache page responsive to the first cache evicting all cached cachelines of the selected cache page.

17. The method of claim 10, further comprising:
maintaining a directory structure having a plurality of entries corresponding to a plurality of cache pages, each entry storing data representing a number of cachelines of the cache page present in at least one cache of the cache hierarchy; and
wherein selectively evicting cachelines comprises:
selecting a cacheline for eviction based on a cacheline replacement policy;
determining a cacheline utilization density of the cache page containing the cacheline based on the directory structure; and
responsive to the cacheline utilization density of the cache page being less than a specified threshold, selecting one or more additional cachelines of the cache page for eviction from the first cache.

18. The method of claim 10, further comprising
preventing selection of cachelines of a cache page for eviction for a specified duration following allocation of an entry in the cache coherence directory for the cache page.

19. A method for caching data in a data processing system, the method comprising:
maintaining, at a cache coherence directory, a set of entries, each entry configured to indicate which cachelines of a plurality of cachelines of a corresponding cache page are cached in a cache hierarchy of the data processing system; and
at each of one or more caches of the cache hierarchy, preferentially evicting cachelines from cache pages having lower numbers of cachelines cached in the cache hierarchy over cache groups having higher numbers of cachelines cached in the cache hierarchy as determined from corresponding entries of the set of entries of the cache coherence directory.

20. The method of claim 19, further comprising:
responsive to determining that cachelines of a cache page are no longer present in the cache hierarchy, deallocating the entry of the set of entries of the cache coherence directory corresponding to that cache page.

* * * * *